US012739356B2

(12) United States Patent
Xue et al.

(10) Patent No.: US 12,739,356 B2
(45) Date of Patent: Sep. 15, 2026

(54) CAMERA PIXEL CALIBRATION APPARATUS AND WINDING DEVICE

(71) Applicant: CONTEMPORARY AMPEREX TECHNOLOGY (HONG KONG) LIMITED, Hong Kong (CN)

(72) Inventors: Yucong Xue, Ningde (CN); Zhipeng Chen, Ningde (CN); Chao Chen, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 451 days.

(21) Appl. No.: 18/486,915

(22) Filed: Oct. 13, 2023

(65) Prior Publication Data

US 2024/0223741 A1 Jul. 4, 2024

Related U.S. Application Data

(63) Continuation of application No. PCT/CN2023/089292, filed on Apr. 19, 2023.

(30) Foreign Application Priority Data

Jan. 3, 2023 (CN) ......................... 202320001530.2

(51) Int. Cl.
*H04N 13/246* (2018.01)
*G06T 7/80* (2017.01)
*H04N 17/00* (2006.01)

(52) U.S. Cl.
CPC ............. *H04N 13/246* (2018.05); *G06T 7/80* (2017.01); *H04N 17/002* (2013.01)

(58) Field of Classification Search
CPC ................................ H04N 13/246; G06T 7/80
See application file for complete search history.

(56) References Cited

U.S. PATENT DOCUMENTS

2012/0081539 A1 4/2012 Ichizawa et al.
2013/0201493 A1 8/2013 Ichizawa
2015/0035970 A1* 2/2015 Brumbaugh ....... G01N 21/9054 348/93

(Continued)

FOREIGN PATENT DOCUMENTS

CN 109489566 A 3/2019
CN 110136204 A 8/2019

(Continued)

OTHER PUBLICATIONS

Extended European Search Report for EP application No. 23785966.5, dated Sep. 16, 2024.

(Continued)

*Primary Examiner* — Minh Q Phan
(74) *Attorney, Agent, or Firm* — Ladas & Parry LLP

(57) ABSTRACT

A camera pixel calibration apparatus and a winding device are provided. The camera pixel calibration apparatus includes: a camera, where the camera has a shooting lens; and a reference assembly, where the reference assembly is disposed between the shooting lens and a coating material. The reference assembly includes a bracket and a calibration plate, the bracket is provided with a camera viewing window, and the calibration plate is disposed on a surface of the bracket close to the shooting lens.

10 Claims, 4 Drawing Sheets

(56) References Cited

U.S. PATENT DOCUMENTS

2019/0373251 A1 12/2019 Schulz et al.

FOREIGN PATENT DOCUMENTS

| | | | | |
|---|---|---|---|---|
| CN | 113532335 | A | | 10/2021 |
| CN | 216763677 | U | * | 6/2022 |
| WO | 2022127918 | A1 | | 6/2022 |

OTHER PUBLICATIONS

International Search Report for International Application PCT/CN2023/089292, dated Jun. 14, 2023.
Written Opinion of International Search Authority for International Application PCT/CN2023/089292, dated Jun. 14, 2023.

* cited by examiner

CAMERA PIXEL CALIBRATION APPARATUS AND WINDING DEVICE

CROSS-REFERENCE TO RELATED APPLICATIONS

This application is a continuation of International Patent Application No. PCT/CN2023/089292, filed on Apr. 19, 2023, which claims priority to Chinese Patent Application No. 202320001530.2, filed on Jan. 3, 2023. The aforementioned patent applications are incorporated herein by reference in their entirety.

TECHNICAL FIELD

This application relates to the field of battery technologies, and in particular, to a camera pixel calibration apparatus and a winding device.

BACKGROUND

Nowadays, power batteries have been widely used in various industries. To ensure safety of batteries, the requirements for their quality in manufacturing are becoming increasingly stringent. In the process of winding electrode plate, a winding machine needs to monitor various parameters of a coating material in real time, preventing safety accidents caused by defective cells flowing into a next process. Currently, a widely used detection method is visual detection, which can meet the requirements for extremely high detection speed and detection accuracy during production.

However, existing visual detection device lacks reliable anti-offset measures during detection. When a relative position or angle of a camera changes due to long-term continuous vibration of the machine or cleaning by workers, it leads to a large measurement error in a measured value of a to-be-detected feature, which causes the winding machine to stop and good cells to be mistakenly removed, wasting materials and affecting production efficiency. In addition, after each device maintenance, pixel accuracy of the coating material needs to be calibrated manually, affecting the production efficiency and resulting in poor consistency of calibration results.

SUMMARY

This application is intended to solve at least one of the technical problems in the prior art. In view of this, an objective of this application is to propose a camera pixel calibration apparatus. The camera pixel calibration apparatus can not only prevent offset of a camera during a winding process of a winding machine but also calibrate camera pixel accuracy.

This application is also intended to propose a winding device to apply the foregoing camera pixel calibration apparatus.

The camera pixel calibration apparatus according to an embodiment of this application includes: a camera, where the camera has a shooting lens; and a reference assembly, where the reference assembly is disposed between the shooting lens and a coating material, the reference assembly includes a bracket and a calibration plate, the bracket is provided with a camera viewing window, and the calibration plate is disposed on a surface of the bracket close to the shooting lens.

The camera pixel calibration apparatus according to the embodiment of this application can not only prevent offset of a camera during a winding process of a winding machine but also calibrate camera pixel accuracy, improving reliability of a visual detection system and production efficiency of a production line.

In some embodiments, the center of the camera viewing window is adjacent to the center of a field of view of the shooting lens; or the center of the camera viewing window coincides with the center of a field of view of the shooting lens. In this manner, it can be ensured that the camera viewing window is always located within the field of view of the camera, ensuring that the coating material is within shooting range.

In some embodiments, the calibration plate is disposed adjacent to an edge of the field of view of the shooting lens, so as to leave sufficient space for the camera viewing window.

In some embodiments, the calibration plate has a calibration surface close to the shooting lens, and a distance between the calibration surface and the coating material is less than a depth of field of the camera, ensuring that the camera can shoot a clear contour of the calibration plate.

In some embodiments, the bracket has a first surface away from the calibration plate, and a reserved gap is provided between the first surface and the coating material, which ensures no contact between the first surface and the coating material, avoiding the coating material from being scratched.

In some embodiments, the bracket is provided with a tab flattening portion and a second surface on which the calibration plate is disposed, and a perpendicular distance between the tab flattening portion and an extension plane of the second surface gradually increases in a direction leaving the calibration plate. In this manner, the tab flattening portion can flatten the tab with the coating material, preventing the tab from curling up and causing scratches and damage to the coating material.

In some embodiments, the tab flattening portion is an arc plate. The arc plate has rounded corners for a stable and smooth transition when coming into contact with the tab, providing a good flattening effect.

In some embodiments, the camera pixel calibration apparatus further includes a light source, where the light source and the camera are located on a same side of the bracket. The light source can provide light to facilitate the camera to shoot a clear image.

In some embodiments, the calibration plate and the bracket have different colors, which is convenient for the camera to identify the calibration plate when shooting images, facilitates better extraction of features of the calibration plate, and improves detection accuracy.

In some embodiments, the shooting lens is configured to shoot contour features of the calibration plate and shoot the coating material through the camera viewing window, and the camera pixel calibration apparatus further includes a controller, where the controller is configured to be able to extract the contour features of the calibration plate through blob analysis and calculate camera pixel accuracy of the calibration plate to obtain camera pixel accuracy of the coating material. The controller can be understood as a control component capable of controlling the camera to capture images and storing CCD software for controlling and calculation.

The winding device according to the embodiments of this application includes: a winding roller configured to wind a coating material; and the camera pixel calibration apparatus described above, where the camera pixel calibration apparatus is disposed on a side of the coating material for shooting the coating material and calibrating camera pixel accuracy of the coating material.

In the winding device according to the embodiments of this application, the camera pixel calibration apparatus disposed can not only prevent offset of the camera during the winding process of the winding machine but also calibrate the camera pixel accuracy, improving the reliability of the visual detection system and the production efficiency of the production line.

For additional aspects and advantages of this application, some will be given in the following description, and some will become apparent in the following description or will be understood in the practice of this application.

BRIEF DESCRIPTION OF DRAWINGS

The above and/or additional aspects and advantages of this application will become obvious and easy to understand from the description of the embodiments with reference to the following drawings.

REFERENCE SIGNS

Figure 1:
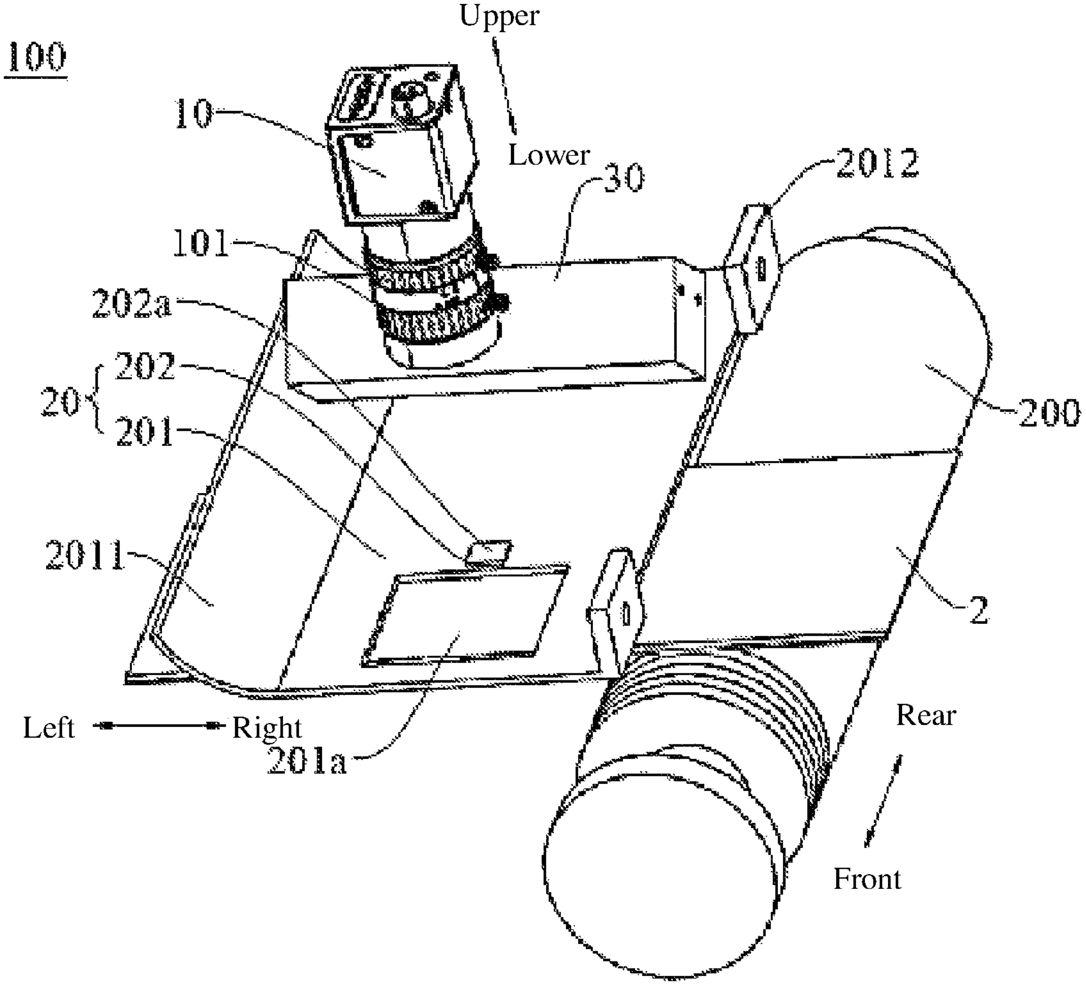
FIG. 1 is a three-dimensional view of a camera pixel calibration apparatus used in combination with a winding roller according to an embodiment of this application.

100. camera pixel calibration apparatus;
10. camera;
101. shooting lens;
101*a*. field of view;
101*b*. edge of field of view;
20. reference assembly;
201. bracket;
201*a*. camera viewing window;
201*b*. first surface;
201*c*. second surface;
201*d*. line of symmetry;
2011. tab flattening portion;
2012. mounting base;
202. calibration plate;
202*a*. calibration surface;
30. light source;
2. coating material;
2*a*. electrode plate;
2*b*. side; and
200. winding roller.

DETAILED DESCRIPTION

The embodiments of this application are described in detail below. Examples of the embodiments are shown in the accompanying drawings, and reference signs that are the same or similar always indicate the same or similar elements or elements with the same or similar functions. The embodiments described below with reference to the accompanying drawings are illustrative and merely for explaining this application, and cannot be construed as any limitations on this application.

In the description of this application, it should be understood that the orientations or positional relationships indicated by the terms "center", "longitudinal", "transverse", "length", "upper", "lower", "front", "rear", "left", "right", "perpendicular", "horizontal", "top", "bottom", "inside", "outside", "clockwise", "axial", "radial", "circumferential", and the like are based on the orientations or positional relationships shown in the accompanying drawings. These terms are merely for ease and brevity of description of this application rather than indicating or implying that the apparatuses or elements mentioned must have specific orientations or must be constructed or manipulated according to specific orientations, and therefore shall not be construed as any limitations on this application.

In addition, a feature limited by "first" and "second" can explicitly or implicitly include one or more such features, and "first" and "second" are intended to distinguish between the features described in no particular order or importance.

In the description of this application, "a plurality of" means at least two unless otherwise stated.

In the description of this application, it should be noted that unless otherwise specified and defined explicitly, the terms "mount", "connect", and "join" should be understood in their general senses. For example, they may refer to a fixed connection, a detachable connection, or an integral connection; a mechanical connection or an electrical connection; and a direct connection, an indirect connection via an intermediate medium, or an internal communication between two elements. Persons of ordinary skill in the art can understand specific meanings of these terms in this application as appropriate to specific situations.

During production of a cell, in the process of winding a coating material, a winding machine needs to monitor in real time various parameters such as alignment between edges of cathode and anode plates and whether a separator completely wraps electrode plates, preventing safety accidents caused by defective cells flowing into a next process. Currently, a widely used detection method is visual detection, which can meet the requirements for extremely high detection speed and detection accuracy during production. However, existing visual detection device lacks reliable anti-offset measures during detection. When a relative position or angle of a camera changes due to long-time continuous vibration of the machine or cleaning by workers, it leads to a large measurement error in a measured value of a to-be-detected feature, which causes the winding machine to stop and good cells to be mistakenly removed, wasting materials and affecting production efficiency. In addition, after each device maintenance, pixel accuracy of the coating material needs to be calibrated manually, affecting the production efficiency and resulting in poor consistency of calibration results.

The applicant has found through research that with a reference assembly disposed between the camera and the coating material and the reference assembly provided including a bracket and a calibration plate disposed on the bracket, offset of the camera can be prevented and the camera pixel accuracy can be automatically calibrated, improving the production efficiency of the cells and the consistency of the calibration results.

The following describes a camera pixel calibration apparatus 100 according to embodiments of this application with reference to FIG. 1 to FIG. 4.

Figure 4:
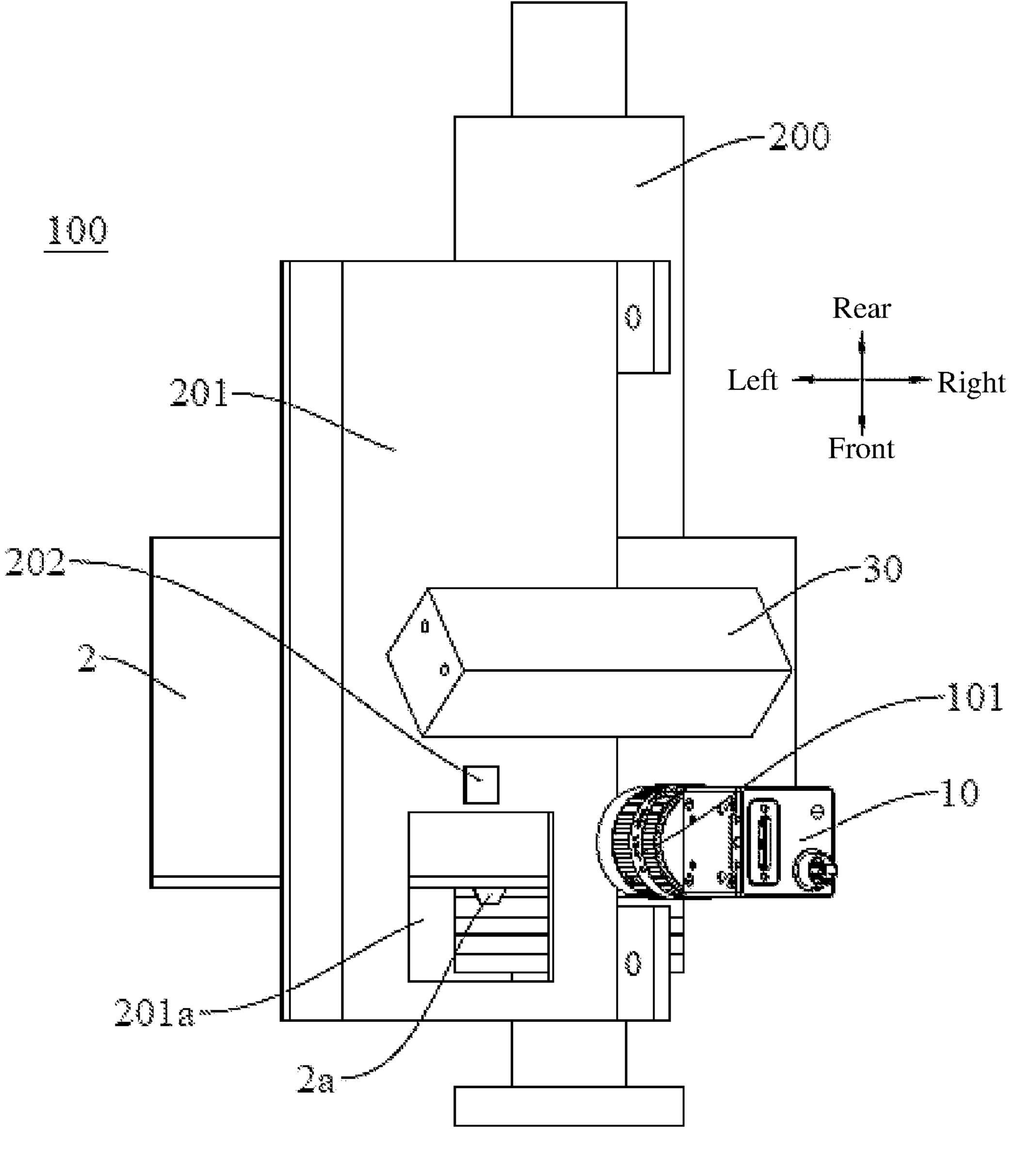
FIG. 4 is a top view of a camera pixel calibration apparatus used in combination with a winding roller according to an embodiment of this application.

As shown in FIG. 1 and FIG. 4, the camera pixel calibration apparatus 100 according to the embodiments of this application includes a camera 10 and a reference assembly 20.

The camera 10 has a shooting lens 101. The reference assembly 20 is disposed between the shooting lens 101 and a coating material 2, the reference assembly 20 includes a bracket 201 and a calibration plate 202, the bracket 201 is provided with a camera viewing window 201*a*, and the calibration plate 202 is disposed on a surface of the bracket 201 close to the shooting lens 101.

The "camera 10" can be understood as a camera used in visual detection, for example, a CCD industrial camera, and can work with corresponding CCD software.

The "coating material 2" can be understood as a positive or negative electrode coating material applied on a surface of an electrode plate.

The "bracket 201" can be understood as a support structure that plays a supporting role.

The "calibration plate 202" can be understood as a sheet-like component mainly for calibration when the camera 10 is shooting.

The shooting lens 101 of the camera 10 shoots the calibration plate 202 to display the calibration plate 202 in an image shot, and determines whether the camera 10 is offset by detecting whether a position and size of the calibration plate 202 have changed in the image. Because whether the camera 10 is offset can be detected by a single reference assembly 20, the reference assembly 20 is disposed flexibly and can be placed at any winding position of a winding machine.

The specific process of detecting whether the camera is offset is as follows: The camera 10 captures an image, and the CCD software acquires the image, extracts a contour of the calibration plate 202 (for example, width and center coordinates) according to a traditional algorithm, and determines whether a value under test meets a preset value. If the value under test meets the preset value, the result is fed back to a controller and the winding machine winds normally. If the value under test does not meet the preset value, the original image is saved locally, the result is fed back to the controller, then an alarm is triggered to stop the machine, and data is uploaded to mes (mes refers to a manufacturing enterprise production process execution management system).

In addition, when the camera pixel calibration apparatus 100 is fixed in position relative to the winding machine, a perpendicular distance L1 between the coating material 2 and the shooting lens 101 and a perpendicular distance L2 between the calibration plate 202 and the shooting lens 101 are determined, and pixel accuracy μ1 of the camera 10 for shooting an image of the calibration plate 202 can also be determined. Then, pixel accuracy μ2 of the coating material 2 can be obtained from L1, L2, and μ1.

The specific detection process of camera pixel accuracy is as follows: The camera 10 captures an image, and the CCD software acquires the image, extracts contour features of the calibration plate 202 through blob analysis, and calculates camera pixel accuracy μ1 of the calibration plate, where μ1=contour of calibration plate (length or width)/total number of pixels occupied. Then, the CCD software calculates camera pixel accuracy μ2 of coating material 2, where μ2=μ1*L2/L1. Finally, the CCD software resets μ2 for running.

The calculation formula involved is: f/WD=Sensor Size (V or H)/FOV (V or H)=μ0/μ.

f is a focal length of the lens; WD is a working distance of the camera (a perpendicular distance from the lens to a target object); Sensor Size is a size of a photosensitive chip of the camera. V is a width of the photosensitive chip of the camera, and H is a height of the photosensitive chip of the camera; FOV is a size of a field of view of the camera, V is a width of the field of view of the camera, and H is a height of the field of view of the camera; μ0 is a pixel size of the camera; and μ is the camera pixel accuracy.

With L1, L2, and μ1 substituted into the formula, it can be deduced that μ2=μ1*L2/L1.

The camera pixel calibration apparatus 100 according to the embodiments of this application can not only prevent offset of the camera during the winding process of the winding machine but also calibrate the camera pixel accuracy, improving reliability of a visual detection system and production efficiency of a production line.

Figure 2:
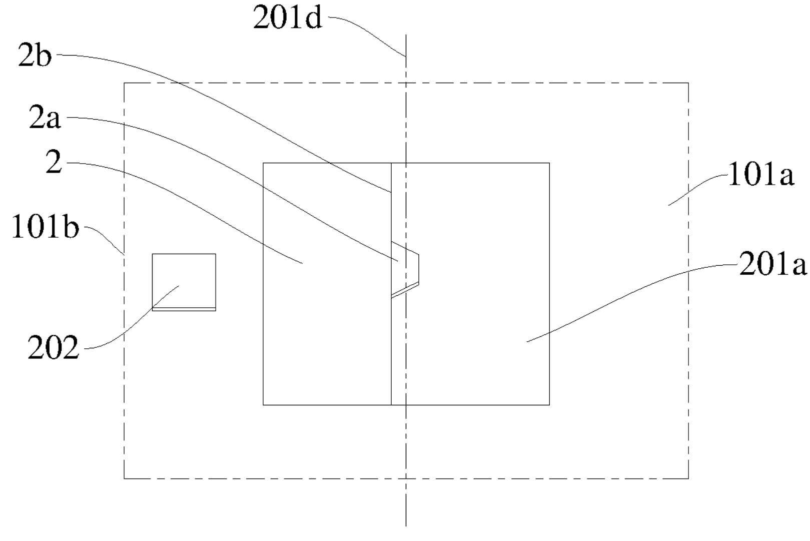
FIG. 2 is a positional relationship diagram among a camera viewing window, a calibration plate, and a field of view of a camera according to an embodiment of this application.

In some embodiments, as shown in FIG. 2, the center of the camera viewing window 201*a* is adjacent to the center of a field of view of the shooting lens 101; or the center of the camera viewing window 201*a* coincides with the center of a field of view of the shooting lens 101.

The "field of view 101*a*" may refer to a size of a region that can be actually shot by the shooting lens 101. The center of the camera viewing window 201*a* may be adjacent to the center of the field of view of the shooting lens 101 or may coincide with the center of the field of view of the shooting lens 101, which ensures that the camera viewing window 201*a* is always located within the field of view 101*a* of the camera, ensuring that the coating material 2 is within shooting range.

In some embodiments, the camera viewing window 201*a* may be constructed as a circular or rectangular window. Certainly, based on specific requirements, the camera viewing window 201*a* may alternatively be constructed as a window of other shapes. Details are not described herein.

In some embodiments, as shown in FIG. 2, the calibration plate 202 is disposed adjacent to an edge 101*b* of the field of view of the shooting lens 101, so as to leave sufficient space for the camera viewing window 201*a*.

In some embodiments, as shown in FIG. 2, the camera viewing window 201*a* has a line of symmetry 201*d*, the line of symmetry 201*d* is perpendicular to a winding axis of the coating material 2, the camera viewing window 201*a* is symmetrical about the line of symmetry 201*d*, and a side 2*b* of the coating material 2 is provided adjacent to the line of symmetry 201*d*. In this manner, an electrode plate 2*a* on the coating material 2 can be in the middle region of the camera viewing window 201*a*, so as to leave sufficient margin when the electrode plate 2*a* is offset left and right during the winding process.

In some embodiments, as shown in FIG. 1, the calibration plate 202 has a calibration surface 202*a* close to the shooting lens 101, and a distance between the calibration surface 202*a* and the coating material 2 is less than a depth of field of the camera 10.

The "depth of field" can be understood as a range of distances in front of and behind an object to be shot, within which the imaging at the forefront of the shooting lens 101 can obtain clear images. The distance between the calibration surface 202*a* and the coating material 2 is set to be less than the depth of field of the camera 10, ensuring that the camera 10 can shoot a clear contour of the calibration plate 202.

Figure 3:
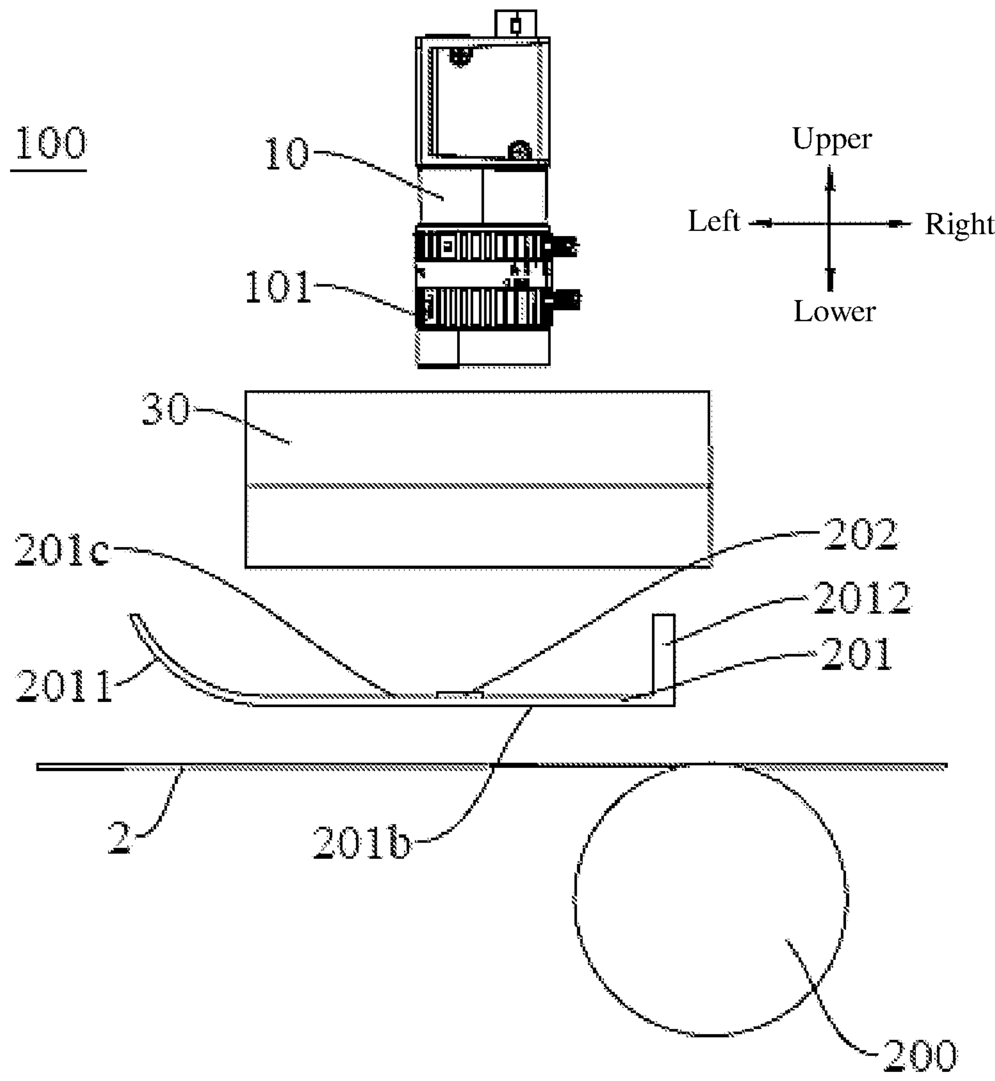
FIG. 3 is a front view of a camera pixel calibration apparatus used in combination with a winding roller according to an embodiment of this application.

In some embodiments, as shown in FIG. 3, the bracket 201 has a first surface 201*b* away from the calibration plate 202, and a reserved gap is provided between the first surface

201*b* and the coating material 2, which ensures no contact between the first surface 201*b* and the coating material 2, avoiding the coating material 2 from being scratched.

In some embodiments, as shown in FIG. 3, the bracket 201 is provided with a tab flattening portion 2011 and a second surface 201*c* on which the calibration plate 202 is disposed, and a perpendicular distance between the tab flattening portion 2011 and an extension plane of the second surface 201*c* gradually increases in a direction leaving the calibration plate 202. In this manner, the tab flattening portion 2011 can flatten the tab with the coating material 2, preventing the tab from curling up and causing scratches and damage to the coating material 2.

In some embodiments, the calibration plate 202 may be constructed as a circular or rectangular plate. Certainly, based on specific requirements, the calibration plate 202 may alternatively be constructed in other shapes. Details are not described herein.

In some embodiments, as shown in FIG. 3, the tab flattening portion 2011 is an arc plate. The arc plate has rounded corners for a stable and smooth transition when coming into contact with the tab, providing a good flattening effect.

In some embodiments, the tab flattening portion 2011 is a straight plate, that is, the tab flattening plate forms an included angle with the bracket 201, which can also flatten the tab.

In some embodiments, the bracket 201 is a support plate, with a simple structure and easy for manufacture. Specifically, the support plate may be a rectangular plate. Certainly, the bracket 201 is not limited to a plate shape, and may alternatively be constructed in other shapes, for example, a support block or a support column, which may be specifically set based on specific requirements. Details are not described herein.

In some embodiments, as shown in FIG. 1 and FIG. 3, the bracket 201 is provided with a mounting base 2012, and the mounting base 2012 is configured to be connected to an external apparatus or component to fix the bracket 201. For example, the mounting base 2012 may be connected to the external apparatus or component using bolts or snaps.

In some embodiments, as shown in FIG. 1, FIG. 3, and FIG. 4, the camera pixel calibration apparatus 100 further includes a light source 30, where the light source 30 and the camera 10 are located on a same side of the bracket 201, and the light source 30 can provide light to facilitate the camera 10 to shoot a clear image.

In some embodiments, the calibration plate 202 and the bracket 201 have different colors, which is convenient for the camera 10 to identify the calibration plate 202 when shooting images, facilitates better extraction of features of the calibration plate 202, and improves detection accuracy.

Optionally, gray levels of the calibration plate 202 and the bracket 201 being greater than or equal to 50 can ensure that the color difference between the calibration plate 202 and the bracket 201 is large, making it easier to extract the features of the calibration plate 202. For example, the color of the bracket 201 is black, and the color of the calibration plate 202 is white.

In some embodiments, the shooting lens 101 is configured to shoot contour features of the calibration plate 202 and shoot the coating material 2 through the camera viewing window 201*a*. The camera pixel calibration apparatus 100 further includes a controller, where the controller is configured to be able to extract the contour features of the calibration plate 202 through blob analysis and calculate camera pixel accuracy of the calibration plate 202 to obtain camera pixel accuracy of the coating material 2. The controller can be understood as a control component capable of controlling the camera 10 to capture images and storing CCD software for controlling and calculation. For example, the controller may be a PLC.

The winding device according to an embodiment of this application includes a winding roller 200 and the camera pixel calibration apparatus 100.

The winding roller 200 is configured to wind the coating material 2. As described above, the camera pixel calibration apparatus 100 is disposed on a side of the coating material 2 for shooting the coating material 2 and calibrating camera pixel accuracy of the coating material 2. The winding roller 200 can be understood as a winding component of a winding machine, which is a core functional component of the winding machine.

Specifically, the camera pixel calibration apparatus 100 may be arranged above the winding roller 200, and the winding roller 200 can rotate clockwise to wind up the coating material 2.

In the winding device according to the embodiment of this application, the camera pixel calibration apparatus 100 disposed can not only prevent offset of the camera during a winding process of the winding machine but also calibrate the camera pixel accuracy, improving the reliability of the visual detection system and the production efficiency of the production line.

Other compositions and operations of the winding device according to the embodiment of this application are all known to persons of ordinary skill in the art and are not described in detail herein.

In the description of this specification, the description referring to the terms "some embodiments", "optionally", "further", "some examples", or the like means that a specific feature, structure, material, or characteristic described with reference to the embodiment or example is included in at least one embodiment or example of this application. In this specification, illustrative expressions of these terms do not necessarily refer to the same embodiment or example. Moreover, the specific features, structures, materials, or characteristics described may be combined in a suitable manner in any one or more embodiments or examples.

Although the embodiments of this application have been shown and described, persons of ordinary skill in the art can understand that various changes, modifications, substitutions, and variants of these embodiments may be made without departing from the principle and essence of this application, and the scope of this application is limited by the claims and its equivalents.

What is claimed is:

1. A camera pixel calibration apparatus, comprising:

a camera, wherein the camera has a shooting lens; and a reference assembly, wherein the reference assembly is disposed between the shooting lens and a coating material, the reference assembly comprises a bracket and a calibration plate, the bracket is provided with a camera viewing window, and the calibration plate is disposed on a surface of the bracket close to the shooting lens; and wherein the bracket is provided with a tab flattening portion and a second surface on which the calibration plate is disposed, and a perpendicular distance between the tab flattening portion and an extension plane of the second surface gradually increases in a direction leaving the calibration plate.

2. The camera pixel calibration apparatus according to claim 1, wherein the center of the camera viewing window is adjacent to the center of a field of view of the shooting lens; or the center of the camera viewing window coincides with the center of a field of view of the shooting lens.

3. The camera pixel calibration apparatus according to claim 1, wherein the calibration plate is disposed adjacent to an edge of the field of view of the shooting lens.

4. The camera pixel calibration apparatus according to claim 1, wherein the calibration plate has a calibration surface close to the shooting lens, and a distance between the calibration surface and the coating material is less than a depth of field of the camera.

5. The camera pixel calibration apparatus according to claim 4, wherein the bracket has a first surface away from the calibration plate, and a reserved gap is provided between the first surface and the coating material.

6. The camera pixel calibration apparatus according to claim 1, wherein the tab flattening portion is an arc plate.

7. The camera pixel calibration apparatus according to claim 1, further comprising:

a light source, wherein the light source and the camera are located on a same side of the bracket.

8. The camera pixel calibration apparatus according to claim 1, wherein the calibration plate and the bracket have different colors.

9. The camera pixel calibration apparatus according to claim 1, wherein the shooting lens is configured to shoot contour features of the calibration plate and shoot the coating material through the camera viewing window, and the camera pixel calibration apparatus further comprises a controller, wherein the controller is configured to be able to extract the contour features of the calibration plate through blob analysis and calculate camera pixel accuracy of the calibration plate to obtain camera pixel accuracy of the coating material.

10. A winding device, comprising:

a winding roller configured to wind a coating material; and the camera pixel calibration apparatus according to claim 1, wherein the camera pixel calibration apparatus is disposed on a side of the coating material for shooting the coating material and calibrating camera pixel accuracy of the coating material.

* * * * *